(12) United States Patent
Asami et al.

(10) Patent No.: US 6,710,313 B1
(45) Date of Patent: Mar. 23, 2004

(54) PLANAR HEATING ELEMENT

(75) Inventors: Naohito Asami, Nara (JP); Mitsuru Yoneyama, Nara (JP); Akira Shiratake, Nara (JP); Kazumi Nagayama, Nara (JP); Osamu Yoshida, Nara (JP); Hiroshi Mitsunaga, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 260 days.

(21) Appl. No.: 09/831,867

(22) PCT Filed: Sep. 21, 2000

(86) PCT No.: PCT/JP00/06461

§ 371 (c)(1),
(2), (4) Date: Jul. 23, 2001

(87) PCT Pub. No.: WO01/21044

PCT Pub. Date: Mar. 29, 2001

(30) Foreign Application Priority Data

Sep. 22, 1999 (JP) ............................................. 11-268637
Sep. 22, 1999 (JP) ............................................. 11-268638

(51) Int. Cl.[7] ................................................. H05B 3/34
(52) U.S. Cl. ....................................... 219/549; 219/212
(58) Field of Search ................................. 219/549, 212, 219/217, 528, 529, 548; 338/208, 210, 214; 174/128.1, 113 R, 115

(56) References Cited

U.S. PATENT DOCUMENTS

| | | | | |
|---|---|---|---|---|
| 3,646,670 A | * | 3/1972 | Maeda et al. | ................ 29/830 |
| 4,279,255 A | * | 7/1981 | Hoffman | ................ 607/112 |
| 4,713,531 A | * | 12/1987 | Fennekels et al. | .......... 219/545 |
| 5,245,161 A | * | 9/1993 | Okamoto | .................... 219/549 |
| 5,391,838 A | * | 2/1995 | Plummer, III | ................ 174/36 |
| 6,229,123 B1 | * | 5/2001 | Kochman et al. | ........... 219/549 |

FOREIGN PATENT DOCUMENTS

| | | |
|---|---|---|
| JP | 48-35973 | 10/1973 |
| JP | 58-128689 | 8/1983 |
| JP | 59-79990 | 5/1984 |
| JP | 62-229782 | 10/1987 |
| JP | 4-112481 | 4/1992 |
| JP | 6-30825 | 2/1994 |
| JP | 8-20225 | 1/1996 |

* cited by examiner

Primary Examiner—Edward K. Look
Assistant Examiner—Vinod D. Patel
(74) Attorney, Agent, or Firm—Wenderoth, Lind & Ponack, L.L.P.

(57) ABSTRACT

A surface heating device comprises a heating element fabricated by braiding plural conductors on a flexible supporter. The surface heating device employs a heating element member which is reduced in thickness or diameter, and thus can be inhibited from providing an uncomfortable touch when sat upon or appearing as a relief on a surface cover of a seat. Also, because a pad is reduced in thickness, the surface cover of the seat can be heated up rapidly. The heating element is fabricated by braiding the conductors, and thus, when loaded with a weight when sat upon, the heating element allows a resultant stress exerted thereon to be dispersed through the conductors, hence being stronger against bending. Moreover, the conductors are inhibited from separating from each other and need no insulating coat.

25 Claims, 14 Drawing Sheets

PLANAR HEATING ELEMENT

TECHNICAL FIELD

The present invention relates to a surface heating device to be used in a seat or the like.

BACKGROUND ART

A conventional surface heating device 21 commonly includes a heating element disposed on a supporter 28 as shown in FIG. 31. The heating element is one of the following:

(a) A heating element 22a, as shown in FIG. 29, having a plurality of conductors 25a coated with an insulating coating 26a; or (b) A heating element 22b, as disclosed in Japanese Utility Model Laid-open Publication 60-80690, where a conductor 25b is wound spirally on a synthetic fabric core 27 and coated with an insulating coat 26b as shown in FIG. 20 for an improved strength against tension and bending.

FIG. 27 illustrates the surface heating device 21 installed in a seat 20 for a vehicle. Even if a heating element 22 has a diameter of 0.5 to 1 mm, the surface heating device 21 may make a driver or a passenger aware of an uncomfortable projection on a surface cover 23 when he/she is seated. It is hence desired to decrease a thickness or diameter of the heating element 22.

FIG. 28 is an enlarged cross sectional view of a region where the surface heating device 21 is installed in the seat 20 for a vehicle. In a conventional manner, a pad 24 provided under the surface cover 23 of the seat 20 needs to have a thickness of 20 to 30 mm for preventing the heating element 22 from making him/her aware of an uncomfortable projection on the surface cover 23. The surface heating device 21 is provided beneath the pad 24.

FIG. 32 is a cross sectional view of a region where the surface cover 23 of the seat 20 has a hanging section provided in the surface cover 23. The hanging section is usually provided at the surface cover 23. The hanging section at the surface cover 23 includes a hanging strip 30 joined to the surface cover 23 and the pad 24 at a sewing portion 33. A hook ring 32 links a fitting 29a joined to the hanging strip 30 and a fitting 29b embedded in a main pad 31.

If the surface heating device 21 is placed under the surface cover 23 of the seat 20 and directly stitched together with the hanging strip 30, the heating element 22 may be injured or cut by a stitching needle. For avoiding such a problem, the surface heating device 21 has an opening 33, as shown in FIG. 31, through which the hanging strip 30 extends, and the heating element is protected from being stitched with the strip 30.

As a result, the pad 24 inhibits the surface heating device 21 from being located directly under the surface cover 23 of the seat 20 and, as a heat insulator, prevents the surface cover 23 from being quickly heated. Therefore, heating quickly the surface cover 23 of the seat 20 requires a large power consumption by the surface heating device 21. However, a capacity of a battery in the vehicle limits heating speed.

The conventional heating element 22a, as shown in FIG. 29, has conductor 25a coated with insulating coat 26a for protecting the conductor from separating and for improving protection strength. Due to the insulating coat 26a, when the heating element 22 is connected to a power supply, the insulating coat 26a has to be removed at a jointed portion of the heating element 22.

The heating element 22 in the surface heating device 21 installed in the vehicle seat 20 requires a small thickness or diameter. Furthermore, the heating element 22 is repeatedly stressed by a weight during sitting of a person on the seat 20, and thus needs a counter measure against being injured and disconnected.

SUMMARY OF THE INVENTION

A surface heating device is provided which includes a heating element fabricated by braiding plural conductors, and a flexible supporter supporting the heating element thereon.

The heating element fabricated by braiding plural conductors has a small thickness or diameter, thus being inhibited from providing a passenger with an uncomfortable touch when he/she is seated and from projecting on a surface cover of a seat. Also, the surface heating device requires a pad having a reduced thickness and thus allows the surface cover of the seat to be heated up rapidly.

The heating element made from braided conductors is strong against being bent by a weight of a seated passenger because a stress exerted on the heating element is dispersed on the conductors. Furthermore, the conductors are protected from separating from each other, and therefore, no insulating coat is necessary.

DETAILED DESCRIPTION OF THE PREFERRED EMBODIMENTS

Some embodiments of the present invention will be described referring to FIG. 1 through FIG. 26.

Embodiment 1

Figure 1:
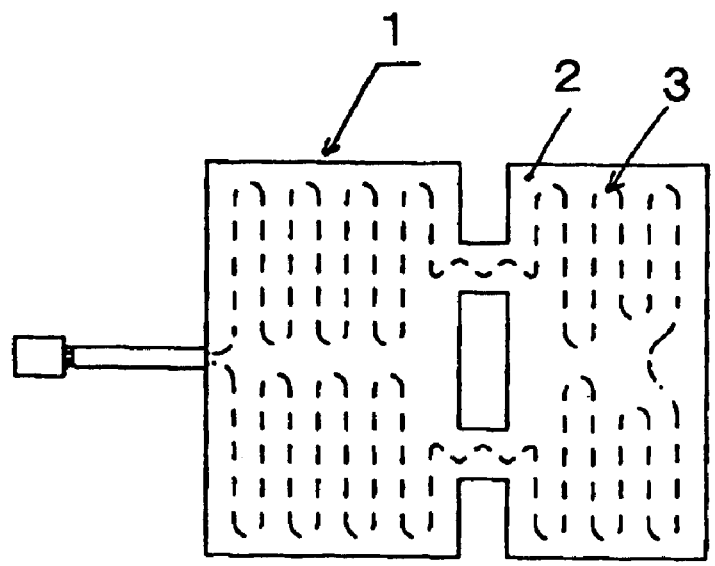
FIG. 1 is a plan view of a surface heating device according to Embodiment 1 of the present invention.
Figure 2:
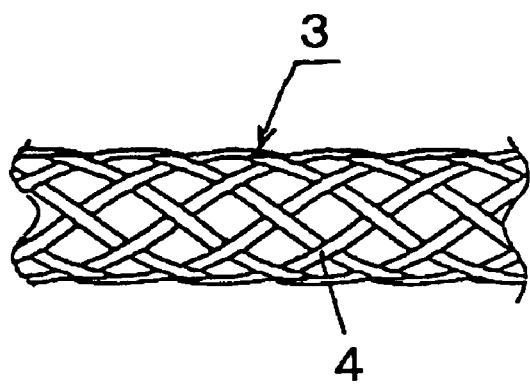
FIG. 2 is an enlarged view of a heating element according to Embodiment 1 of the present invention.

FIG. 1 is a plan view of a surface heating device 1 installed on a seat 20 for a vehicle, where a heating element 3 is disposed on a flexible supporter 2. FIG. 2 is an enlarged view of the heating element 3, which is formed by braiding plural conductors 4.

Figure 3:
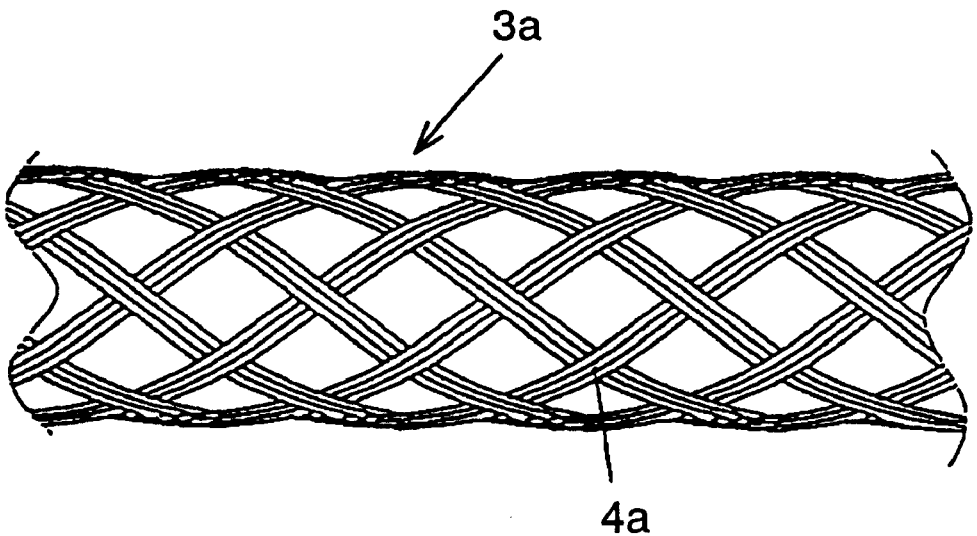
FIG. 3 is an enlarged view of the heating element according to Embodiment 1 of the present invention.

A heating element 3a shown in FIG. 3 is formed by braiding plural stranded conductors 4a. The heating element 3a is more flexible than is the heating element 3 formed with single-line conductors 4 shown in FIG. 2.

The heating element including braided conductors 4a exhibits a greater strength against a stress exerted by weight of a seated person because stress to the conductors is dispersed.

Also, the conductors 4a are inhibited from separating, and thus, an insulating coat, which is essential in the prior art, is eliminated. This allows the heating element 3a to be directly soldered and applied to a solder-less joint, by performing spot welding for example.

A number of the conductors 4a or a braiding pitch is changed, so that a desired resistance per unit length ($\Omega$/m) of the heating element 3a may be determined.

Embodiment 2

Figure 4:
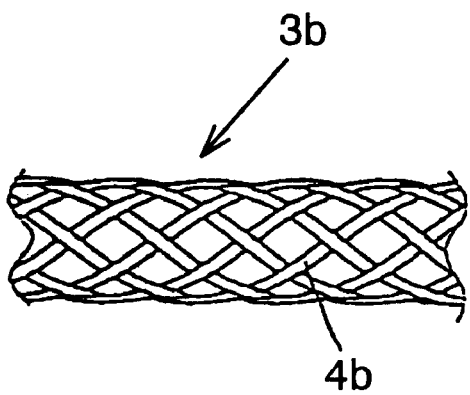
FIG. 4 is an enlarged view of a heating element according to Embodiment 2 of the present invention.

FIG. 4 is an enlarged view of a heating element 3b formed by braiding plural conductors 4b of a single type or material. Resistance per unit length ($\Omega$/m) of the heating element 3b is determined to a desired value by simply changing a number of the conductors 4b.

Figure 5:
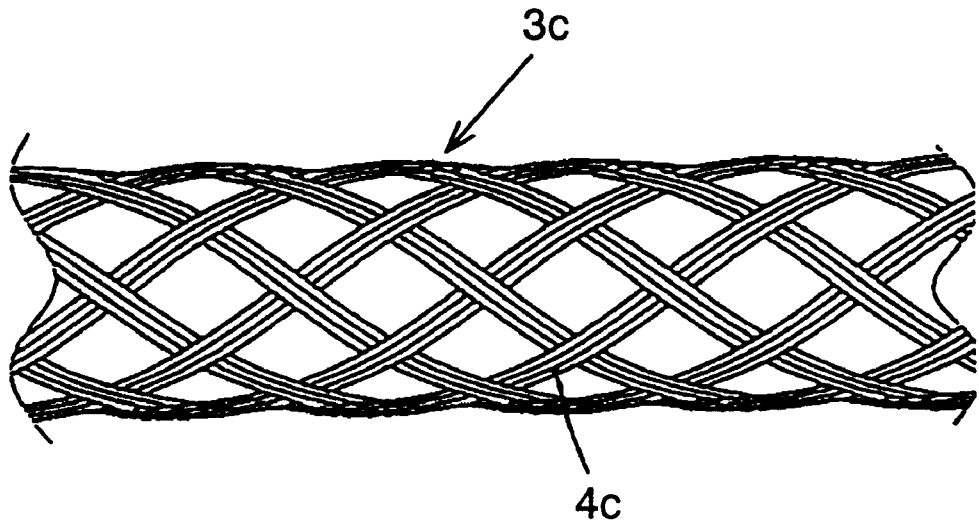
FIG. 5 is an enlarged view of the heating element according to Embodiment 2 of the present invention.

As shown in FIG. 5, a heating element 3c includes stranded conductors 4c. Each of the conductors 4c includes plural conductors of a single type. Similarly, resistance per unit length ($\Omega$/m) of the heating element 3c can be determined to a desired setting by simply changing a number of conductors in each conductor 4c.

Embodiment 3

Figure 6:
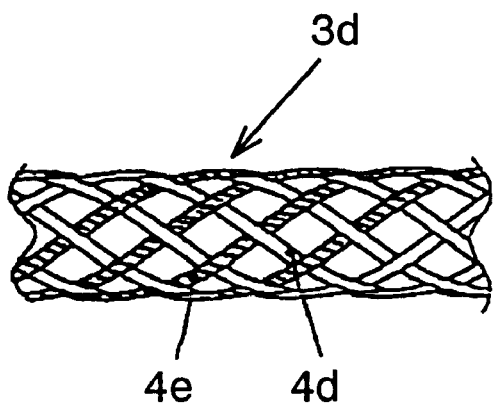
FIG. 6 is an enlarged view of a heating element according to Embodiment 3 of the present invention.

FIG. 6 is an enlarged view of a heating element 3d having plural conductors 4d of a single type, and plural conductors 4e of another type or material denoted by hatching. Resistance per unit length ($\Omega$/m) of the heating element 3d can be determined to a desired setting by simply changing a number of conductors in the conductors 4d and 4e, or changing materials of the conductors, while a setting range is wider than that of conductors 4c.

Figure 7:
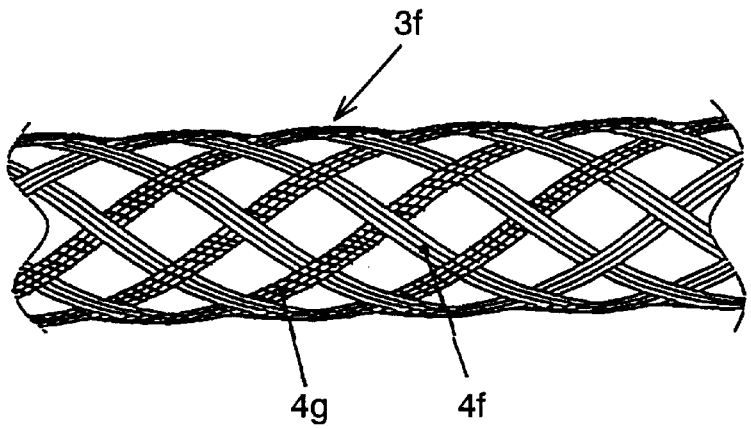
FIG. 7 is an enlarged view of the heating element according to Embodiment 3 of the present invention.

FIG. 7 is an enlarged view of a heating element 3f where groups of conductors 4f of a single type, and groups of conductors 4g of another type denoted by the hatching, are braided. Resistance per unit length ($\Omega$/m) of the conductors 4f and 4g of a single type is set easier than that of conductor 4c. Also, a setting range of the resistance per unit length ($\Omega$/m) increases.

Embodiment 4

Figure 8:
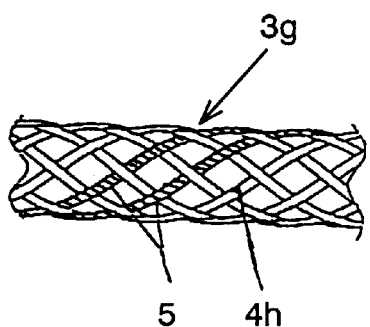
FIG. 8 is an enlarged view of a heating element according to Embodiment 4 of the present invention.

FIG. 8 is an enlarged view of a heating element 3g formed by braiding where plural conductors 4h with a core wire 5 which is denoted by hatching. The core wire 5 may be a steel wire such as a piano steel or stainless steel wire for increasing strength against tension or bending of the heating element 3g.

Figure 9:
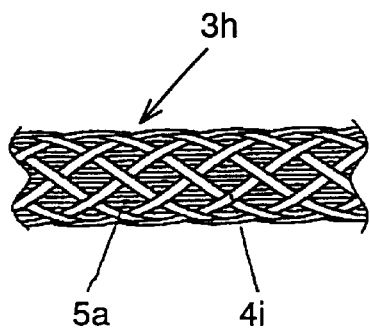
FIG. 9 is an enlarged view of the heating element according to Embodiment 4 of the present invention.

FIG. 9 is an enlarged view of a heating element 3h formed by braiding plural conductors 4i on and about a group of core wires 5a. The core wires 5a increase strength against tension and bending of the heating element 3h, and improves flexibility. The core wires 5a may preferably be stranded aromatic polyamide fibers, stranded polyester fibers, or stranded carbon fibers.

Embodiment 5

Figure 10:
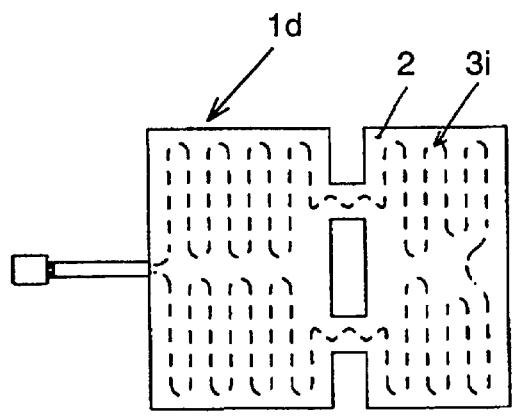
FIG. 10 is a plan view of a surface heating device according to Embodiment 5 of the present invention.

FIG. 10 is a plan view of a surface heating device 1d installed in a seat 20 of a vehicle, where a heating element 3i is disposed on a flexible supporter 2. The heating element 3i is a conductor reinforced with a metal fiber. Resistance of the heating element 3i is set to a desired value by using a silver alloy wire as the conductor. The heating element 3i of the surface heating device 1d installed in the seat 20 may preferably range from 0.02 to 0.50 mm in diameter and contain 3 to 10 wt % silver.

Figure 11:
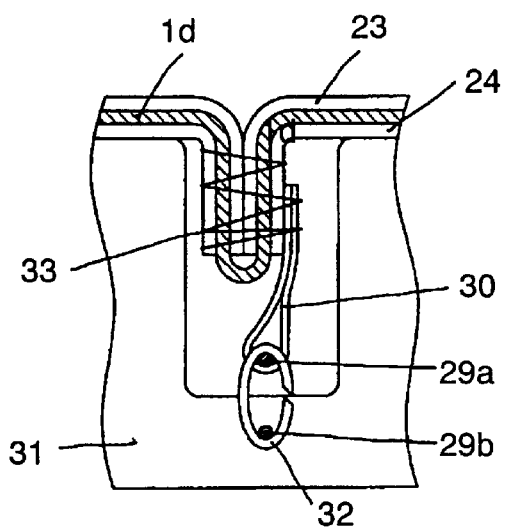
FIG. 11 is an enlarged cross sectional view of a hanging section according to Embodiment 5 of the present invention.

The conductor reinforced with a metal fiber may be a silver contained copper alloy, which is fabricated by the following method. A solid solution of crystallized copper and a metal casting alloy of a eutectic form is fabricated by fusing and rapidly cooling a mixture of copper and silver. The solid solution is subjected to alternate hot and cool processes where the metal casting alloy is separated. The solid solution is protended so as to have a composite fiber structure of the crystallized copper solid and a copper/silver eutectic form. As a result, the fiber is ten times stronger against tension and bending than that of the prior art, and hence can be stitched with a sewing machine. Referring to FIG. 11, surface heating device 1d provided beneath surface cover 23 of the seat 20 can be stitched together with a pad 24 so as to be joined to a hanging strip 30.

Embodiment 6

Figure 12:
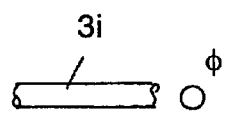
FIG. 12 is an enlarged view of a heating element according to Embodiment 6 of the present invention.
Figure 13:
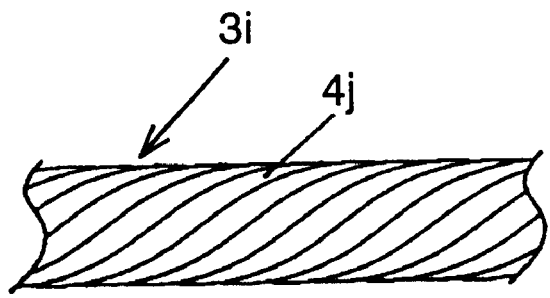
FIG. 13 is an enlarged view of the heating element according to Embodiment 6 of the present invention.

FIG. 12 illustrates heating element 3i implemented by a single wire made of a silver contained copper alloy as a fiber reinforced with a metal. FIG. 13 shows another modification of the heating element 3i, where plural wires 4j made of a silver contained copper alloy, as a fiber, are stranded. Resistance per unit length ($\Omega$/m) of the heating element 3i shown in FIG. 12 is set to a desired value by just changing a diameter and content of silver. In the modification shown in FIG. 13, resistance per unit length ($\Omega$/m) of the heating element 3i is set to a desired value by just changing a number of the alloy wires 4j.

Embodiment 7

Figure 14:
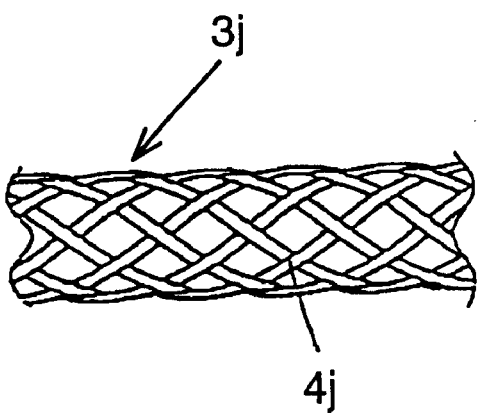
FIG. 14 is an enlarged view of a heating element according to Embodiment 7 of the present invention.

FIG. 14 is an enlarged view of a heating element 3j, where plural silver contained copper alloy wires 4j, as a fiber, reinforced with metal are braided. This allows the copper alloy wires 4j to be prevented from being separated and to omit an insulating coat covering the wires. Also, as stress exerted on the copper alloy wires 4j is favorably dispersed, the heating element 3j is increased in terms of bending strength.

Moreover, the copper alloy wires 4j are stranded but not fixed to each other, and are thus easily movable. Even when assaulted by a stitching needle, the copper alloy wires 4j easily escape from the needle, thus being hardly bitten by the needle. Consequently as shown in FIG. 11, the surface heating device 1d provided beneath the surface cover 23 of a seat 20 can be stitched together with pad 24 and a hanging strip 30. Also, the heating element 3j, of which parts disposed at an inner region and an outer region are connected in parallel, can employ a heating element having high resistance per unit length ($\Omega$/m). This permits the copper alloy wires 4j to be favorably reduced in diameter and a number of conductors, hence reducing a difference in resistance between the copper alloy wires 4j.

Embodiment 8

Figure 15:
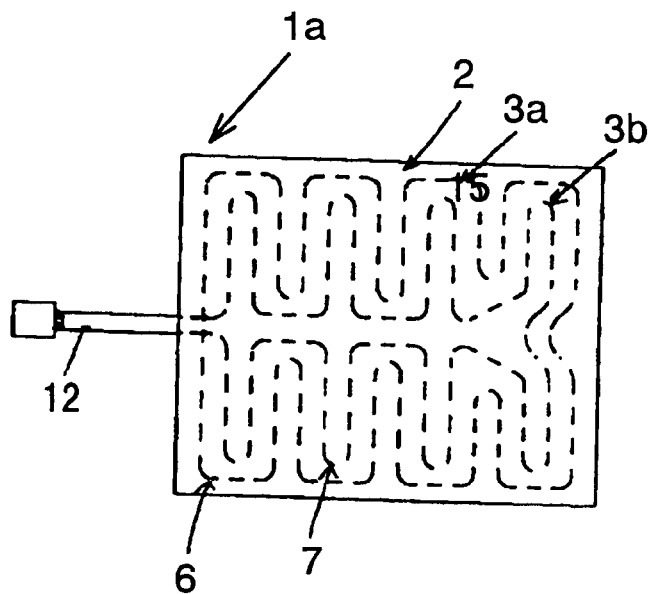
FIG. 15 is a plan view of a surface heating device according to Embodiment 8 of the present invention.

FIG. 15 is a plan view of a surface heating device 1a. Heating elements 3a and 3b are provided on a supporter 2. The heating element 3a extends in an outer region 6 of the supporter 2, and the heating element 3b extends in an inner region 7 of the supporter. The heating elements 3a and 3b, disposed respectively in regions 6 and 7, are connected to each other and joined to a single power supply 12. Since the heating element members 3a and 3b are connected in parallel, an overall resistance of the surface heating device 1a is reduced.

The greater the resistance per unit length ($\Omega$/m) of heating element 3 is, the smaller the diameter of conductor 4 can be. As a result, the heating element 3 comprises a low number of conductors 4. An increased resistance per unit length ($\Omega$/m), due to a smaller thickness of the heating element 3, can be offset with the heating elements 3a and 3b connected in parallel.

Embodiment 9

Figure 16:
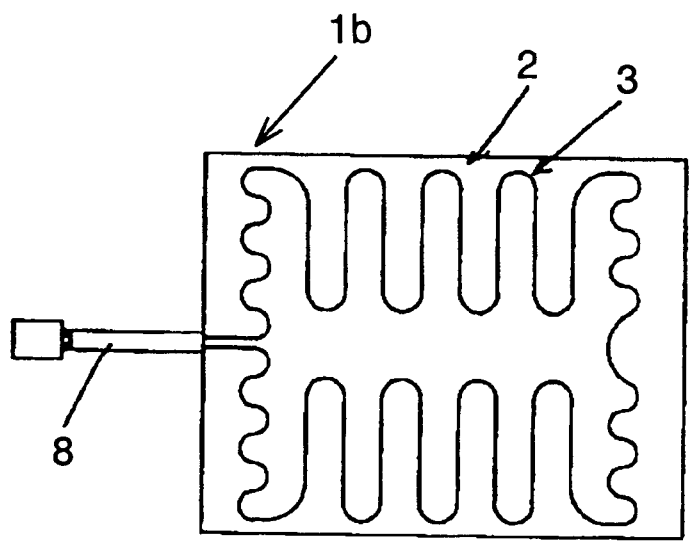
FIG. 16 is a plan view of a surface heating device according to Embodiment 9 of the present invention.

FIG. 16 is a plan view of a surface heating device 1b where a heating element 3 is disposed in a wave pattern in an outer region of a support 2 (at both, left and right, ends of the surface heating device 1b in the drawing).

Surface heating device 1 installed in a seat 20 of a vehicle receives a load at a center and wrinkles radially about the center. The surface heating device 1 may wrinkle more deeply towards an outer region of the surface heating device, thus becoming disconnected.

The heating element 3 according to this embodiment is made stronger against bending. The heating element 3, which is arranged in the wave pattern at the outer region of the surface heating device 1b, is made stronger against a bending stress thereon, because such stress is dispersed.

Figure 17:
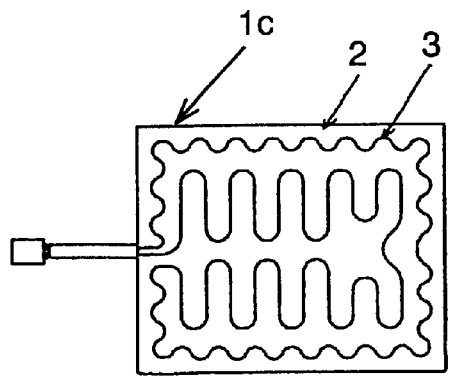
FIG. 17 is a plan view of a surface heating device according to Embodiment 9 of the present invention.

FIG. 17 is a plan view of another surface heating device 1c, where heating element 3 is disposed in a wave pattern on and along an outer region of a supporter 2. This further increases a bending strength of the surface heating device.

Embodiment 10

Figure 18:
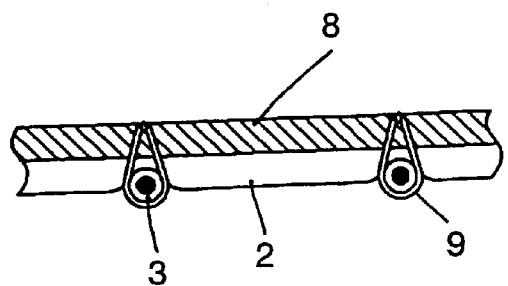
FIG. 18 is an enlarged cross sectional view of a surface heating device according to Embodiment 10 of the present invention.
Figure 19:
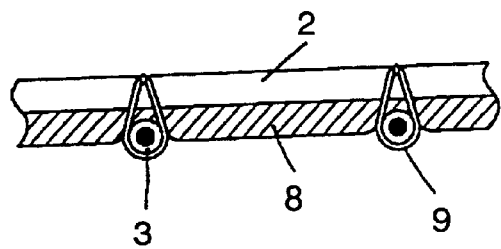
FIG. 19 is an enlarged cross sectional view of the surface heating device according to Embodiment 10 of the present invention.

FIGS. 18 and 19 are enlarged cross sectional views of a surface heating device, where a heating element 3 is held by a thread 9 to a supporter 2 on which a heat leveling element 8 is provided. More specifically, FIG. 18 illustrates the heat leveling element 8 disposed on the supporter 2 opposite to the heating element 3, while FIG. 19 illustrates heat leveling element 8, disposed on supporter 2, to which the heating element 3 is held. A temperature of the heating element 3 having a wire shape is highest at a center and declines in a direction away from the center. Accordingly, heat distribution of surface cover 23 of seat 20 of a vehicle largely depends upon a location of the heating element 3. The heat leveling element 8 disperses heat generated by the heating element 3 uniformly throughout the surface cover 23 of the seat 20.

Figure 20:
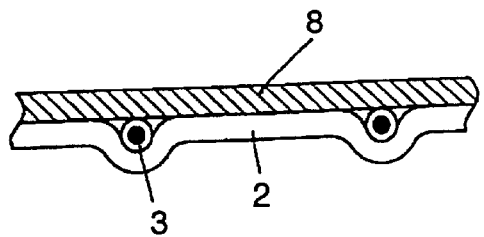
FIG. 20 is an enlarged cross sectional view of the surface heating device according to Embodiment 10 of the present invention.
Figure 21:
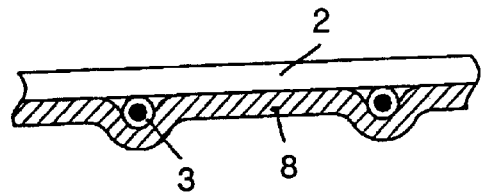
FIG. 21 is an enlarged cross sectional view of the surface heating device according to Embodiment 10 of the present invention.
Figure 22:
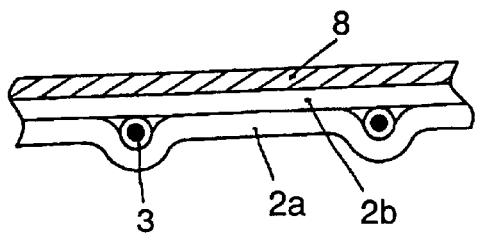
FIG. 22 is an enlarged cross sectional view of the surface heating device according to Embodiment 10 of the present invention.

FIGS. 20 and 21 are enlarged cross sectional views of another surface heating device, where a heating element 3 is held between a supporter 2 and a heat leveling element 8. Also, as shown in FIG. 22 heating element 3 is held between a couple of supporters 2a and 2b, which are accompanied by heat leveling element 8. These constructions provide the same effect as that of the implementations shown in FIGS. 18 and 19.

Embodiment 11

Figure 23:
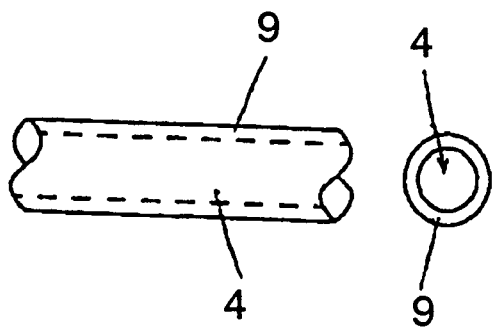
FIG. 23 is an enlarged view of a conductor according to Embodiment 11 of the present invention.

FIG. 23 is an enlarged view of a conductor 4 coated with a plated layer 9. The plated layer 9 protects the conductor 4 from being deteriorated with regard to resistance due to water or corrosion. Also, the plated layer makes any difficult to solder material, such as steel wire, be joinable via solder.

Figure 24:
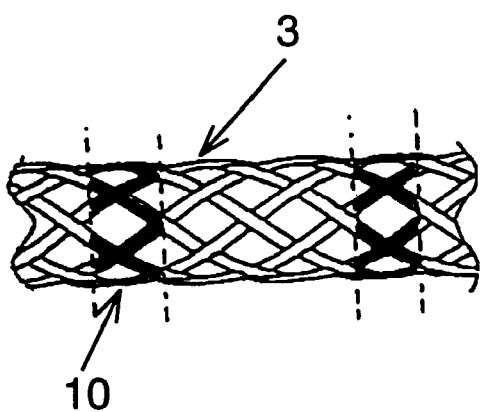
FIG. 24 is an enlarged view of a heating element according to Embodiment 11 of the present invention.

The plated layer 9 covering of heating element 3 can be marked with a color paint 10 as shown in FIG. 24 for indicating resistance per unit length ($\Omega$/m).

Embodiment 12

Figure 25:
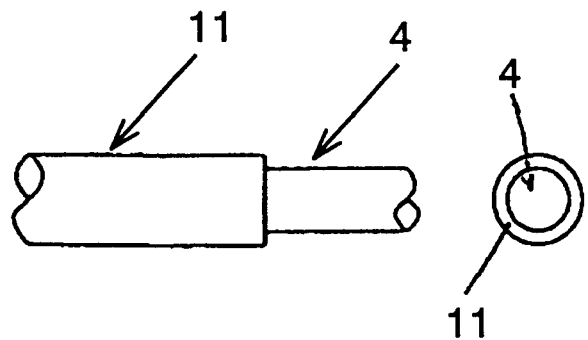
FIG. 25 is an enlarged view of a heating element according to Embodiment 12 of the present invention.
Figure 26:
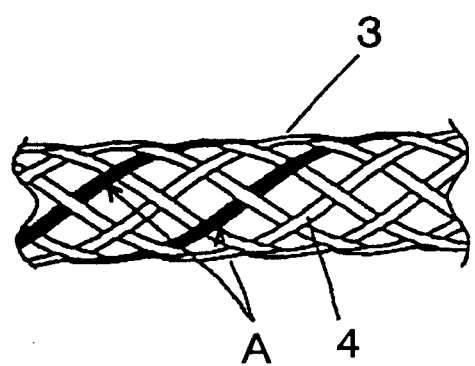
FIG. 26 is an enlarged view of the heating element according to Embodiment 12 of the present invention.
Figure 27:
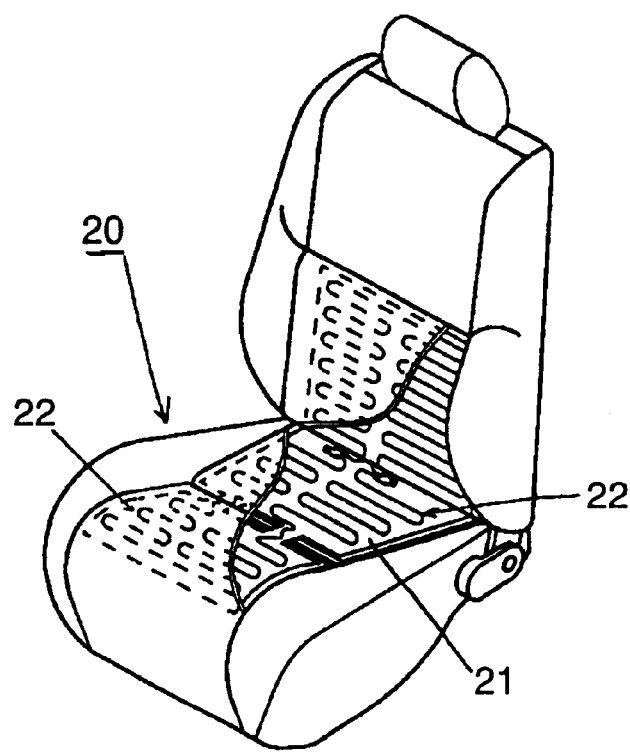
FIG. 27 is a perspective view of seat for a vehicle.
Figure 28:
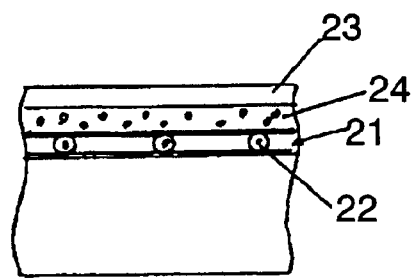
FIG. 28 is an enlarged cross sectional view of the seat for a vehicle.
Figure 29:
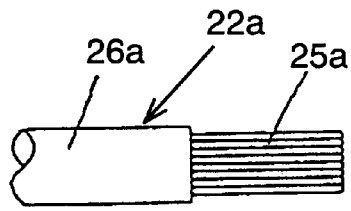
FIG. 29 is an enlarged view of a conventional heating element.
Figure 30:
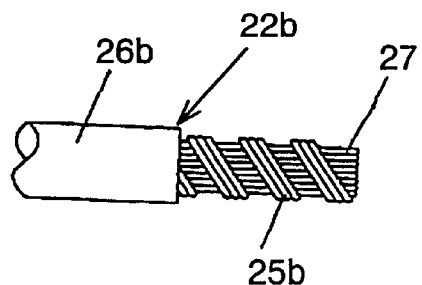
FIG. 30 is an enlarged view of a conventional heating element.
Figure 31:
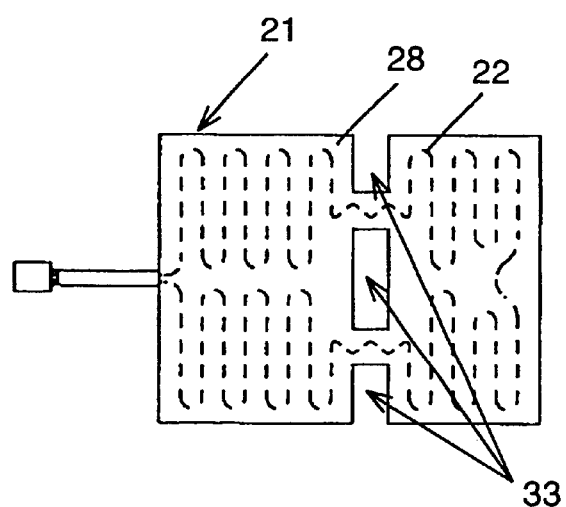
FIG. 31 is a plan view of a conventional surface heating device.
Figure 32:
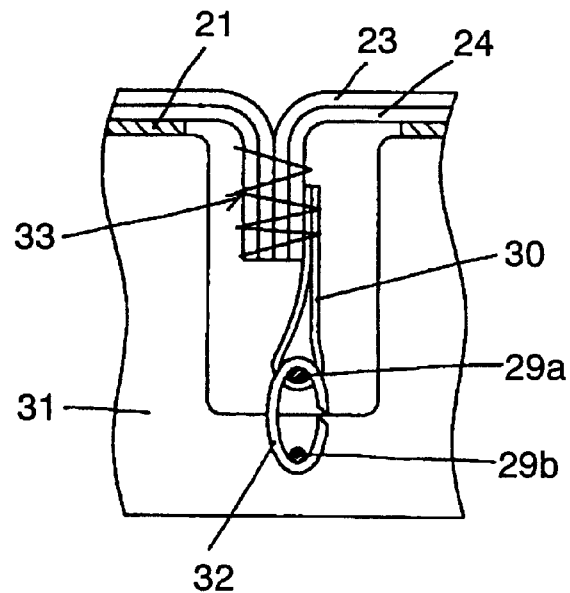
FIG. 32 shows the conventional surface heating device installed on a vehicle seat.
Figure 33:
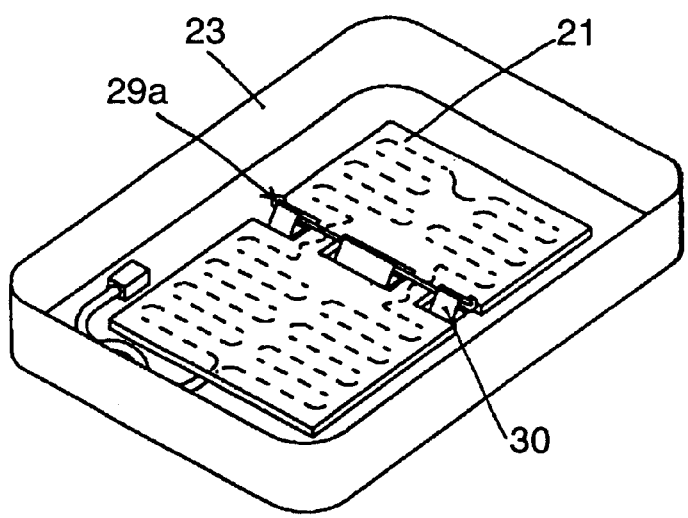
FIG. 33 is a perspective view showing the conventional surface heating device installed at a surface cover of a seat for a vehicle.

FIG. 25 is an enlarged view of a conductor 4 coated with an insulating coat 11. This inhibits the conductor 4 from deteriorating with regard to resistance due to water or corrosion as thickness becomes smaller.

The conductor 4 may be marked on the insulating coat 11 with a color paint (two lines A in FIG. 26) for indicating resistance per unit length ($\Omega$/m).

Industrial Applicability

A surface heating device for a seat according to the present invention employs a thin heating element having a small diameter. Accordingly, the heating device is inhibited from appearing as a relief on a surface cover of the seat and from providing an uncomfortable touch when sat upon. The thin heating element can rapidly heat up the surface cover of the seat.

What is claimed is:

1. A surface heating device comprising:

a flexible supporter; and a heating element disposed on said flexible supporter, said heating element including plural braided conductors, said plural braided conductors including two conductors made of materials different from each other, respectively.

2. The surface heating device according to claim 1, further comprising a core wire in said heating element.

3. The surface heating device according to claim 1, wherein said heating element comprises:

a first heating element disposed in an outer region of said flexible supporter; and a second heating element disposed on an inner region of said flexible supporter and coupled in parallel with said first heating element.

4. The surface heating device according to claim 3, wherein said first heating element is disposed in a wave pattern.

5. The surface heating device according to claim 4, further comprising a heat leveling element disposed on one surface of said flexible supporter.

6. The surface heating device according to claim 4, further comprising a plated layer covering each of said plural braided conductors.

7. The surface heating device according to claim 4, further comprising an insulating coat covering each of said plural braided conductors.

8. The surface heating device according to claim 3, further comprising a heat leveling element disposed on one surface of said flexible supporter.

9. The surface heating device according to claim 3, further comprising a plated layer covering each of said plural braided conductors.

10. The surface heating device according to claim 3 further comprising an insulating coat covering each of said plural braided conductors.

11. The surface heating device according to claim 1, further comprising a heat leveling element disposed on one surface of said flexible supporter.

12. The surface heating device according to claim 1, further comprising a plated layer covering each of said plural braided conductors.

13. The surface heating device according to claim 1, further comprising an insulating coat covering each of said plural braided conductors.

14. A surface heating device comprising:

a flexible supporter; and a heating element disposed on said flexible supporter, said heating element including a conductor reinforced with a metal fiber having a copper solid solution and a copper/silver eutectic form.

15. The surface heating device according to claim 14, wherein said conductor is one of a single wire and a stranded wire.

16. The surface heating device according to claim 14, wherein said conductor is braided.

17. The surface heating device according to claim 14, wherein said heating element comprises:

a first heating element disposed in an outer region of said flexible supporter; and a second heating element disposed on an inner region of said flexible supporter and coupled in parallel with said first heating element.

18. The surface heating device according to claim 14, further comprising a heat leveling element disposed on one surface of said flexible supporter.

19. The surface heating device according to claim 14, further comprising a plated layer covering said conductor.

20. The surface heating device according to claim 14, further comprising an insulating coat covering said conductor.

21. A surface heating device comprising:

a flexible supporter;

a heating element disposed on said flexible supporter, said heating element including plural braided conductors; and a synthesized core fiber in said heating element.

22. The surface heating device according to claim 21, wherein said synthesized core fiber comprises one of an aromatic polyamide fiber, a polyester fiber and a carbon fiber.

23. A surface heating device comprising:

a flexible supporter;

a heating element disposed on said flexible supporter, said heating element including plural braided conductors; and a steel core wire in said heating element.

24. A surface heating device comprising:

a flexible supporter;

a heating element disposed on said flexible supporter, said heating element comprising plural braided conductors; and a group of core wires in said heating element.

25. The surface heating device according to claim 24, wherein said group of core wires comprises one of stranded aromatic polyamide fibers, stranded polyester fibers and stranded carbon fibers.

* * * * *